United States Patent Office.

ANTONIN GERMOT, OF ASNIÈRES, FRANCE.

PROCESS OF OBTAINING METALLIC LEAD FROM LEAD ORES.

SPECIFICATION forming part of Letters Patent No. 690,520, dated January 7, 1902.

Application filed December 15, 1899. Serial No. 740,374. (No specimens.)

*To all whom it may concern:*

Be it known that I, ANTONIN GERMOT, a citizen of the Republic of France, and a resident of 22 Avenue de Courbevoie, Asnières, near Paris, France, have invented a certain new and useful Improved Process of Obtaining Metallic Lead from Lead Ores, (for which I have applied for patents in France, dated May 27, 1899; in Belgium, dated November 11, 1899, and in Luxemburg, dated November 12, 1899,) of which the following is a specification.

The object of this invention is a method of treatment of lead ores in order to obtain, on the one hand, metallic lead containing the whole of the silver which the ore may contain, and, on the other hand, metallic lead free from silver.

To this end use is made of a crucible or converter the top of which is furnished with an eduction-pipe leading to a suitable collecting-chamber or to several such chambers, the top of the crucible around the orifice of the said eduction-pipe being hermetically closed, so as to prevent any entry of air.

At starting a first mass of galena is melted in the crucible, and through the melted mass a current of air is blown either through the bottom or the side of the crucible or by means of a vertical blast-nozzle entering the molten mass. The galena rapidly becomes liquefied, and the injected air burns part of its sulfur, producing sulfurous acid and lead, according to the formula $$PbS + 2O = Pb + SO_2.$$

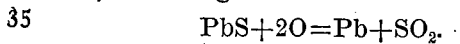

The combustion of the air injected raises the temperature, which is maintained by the continuous addition of fresh quantities of ore. The lead separates from the sulfurous portion, the latter occupying the upper part and the former accumulating in the lower part of the crucible in a mass containing the whole of the silver in the ore. The sulfurous acid escapes from the upper portion, carrying off without contact of external air a quantity of sulfid of lead free from silver, which passes by the eduction-pipe into the collectors, where it condenses in the form of a black, heavy, and very fine powder, which is easily collected, even during the course of the operation, for reintroduction into the same crucible or for introduction into a similar and separate crucible. Where the ore treated contains no silver, the eduction-pipe may be carried vertically upward to a sufficient height for the sulfid powder to fall back into the molten mass in the crucible.

Where the ore treated contains other metals besides lead—such, for instance, as silver—the distilled and condensed galena contains no silver, the whole of that metal remaining in the lead. If, therefore, the condensed galena be further separately treated in the same way as the original galena, a very pure lead will be obtained.

Having now described my invention, what I claim as new, and desire to secure by Letters Patent, is—

1. A process of treatment of lead ores for obtaining metallic lead therefrom consisting in blowing air through a mass of molten galena preventing any access of air to the fumes of sulfid of lead which separate from the mass and collecting the said fumes of sulfid of lead.

2. A process of treatment of lead ores for obtaining metallic lead therefrom, consisting in blowing air through a mass of molten sulfid of lead containing silver or other metals, condensing without contact of external air the fumes of sulfid of lead which separate from the mass, introducing the said condensed fumes into a mass of lead or of lead and sulfid of lead containing no silver or other metals and blowing a current of air therethrough.

In witness whereof I have hereunto set my hand in presence of two witnesses.

ANTONIN GERMOT.

Witnesses:
   EDWARD P. MACLEAN,
   HIPPOLYTE JOSSE.